US008201976B2

(12) United States Patent
Cho et al.

(10) Patent No.: US 8,201,976 B2

(45) Date of Patent: Jun. 19, 2012

(54) HEAT-DISSIPATING APPARATUS

(75) Inventors: Jin-Hwan Cho, Gyeongbuk (KR); Hak-Bong Kim, Gyeongbuk (KR)

(73) Assignee: SL Seobong, Cheonan (KR)

( * ) Notice: Subject to any disclaimer, the term of this patent is extended or adjusted under 35 U.S.C. 154(b) by 150 days.

(21) Appl. No.: 12/338,896

(22) Filed: Dec. 18, 2008

(65) Prior Publication Data

US 2009/0154180 A1 Jun. 18, 2009

(30) Foreign Application Priority Data

Dec. 18, 2007 (KR) ........................ 10-2007-0133480

(51) Int. Cl.
*F21V 29/00* (2006.01)
*B60Q 1/00* (2006.01)

(52) U.S. Cl. ......................... 362/294; 362/547; 362/373

(58) Field of Classification Search .................. 362/294, 362/373, 547; 257/99
See application file for complete search history.

(56) References Cited

U.S. PATENT DOCUMENTS 5,944,097 A * 8/1999 Gungor et al. ................ 165/185
6,045,240 A * 4/2000 Hochstein ..................... 362/294
6,517,218 B2 * 2/2003 Hochstein ..................... 362/294
6,614,103 B1 * 9/2003 Durocher et al. ............. 257/678
7,495,322 B2 * 2/2009 Hashimoto et al. ........... 257/676
7,497,596 B2 * 3/2009 Ge ................................ 362/294
7,513,659 B2 * 4/2009 Vukosic et al. ............... 362/373
7,572,033 B2 * 8/2009 Sun et al. ...................... 362/294
7,604,380 B2 * 10/2009 Burton et al. ................. 362/294
7,625,104 B2 * 12/2009 Zhang et al. .................. 362/294
7,651,245 B2 * 1/2010 Thomas et al. ............... 362/294
7,736,027 B2 * 6/2010 Ge ................................ 362/294
7,889,502 B1 * 2/2011 Reis et al. ..................... 361/717

FOREIGN PATENT DOCUMENTS

JP 09-064251 3/1997
JP 2006-114275 4/2006

* cited by examiner

*Primary Examiner* — Peggy A. Neils
(74) *Attorney, Agent, or Firm* — Edwards Wildman Palmer LLP

(57) ABSTRACT

A heat-dissipating apparatus for a vehicle lamp includes: a heat-dissipating apparatus including: an LED-mounting block having an LED mounted thereon; a thermally conductive material disposed adjacent to the LED-mounting block for transmitting heat generated by the LED; and a heat sink disposed adjacent to the thermally conductive material for dissipating the heat transmitted by the thermally conductive material, wherein at least one concave portion is formed in one side of the LED-mounting block which is adjacent to the thermally conductive material, one side of the heat sink which is adjacent to the thermally conductive material, or both. The thermally conductive material is inserted in the concave portion or portions.

14 Claims, 6 Drawing Sheets

HEAT-DISSIPATING APPARATUS

CROSS-REFERENCE TO RELATED APPLICATION

This application claims priority from Korean Patent Application No. 10-2007-0133480 filed on Dec. 18, 2007, the disclosure of which is incorporated herein by reference in its entirety.

BACKGROUND

1. Technical Field

The present invention relates to a heat-dissipating apparatus which can position a light emitting diode (LED) more precisely.

2. Related Art

A vehicle is equipped with vehicle lamps. Vehicle lamps have lighting function and signaling function, among others. That is, vehicle lamps enable the driver of the vehicle to easily detect objects around and ahead of the vehicle while driving at night or in a dark area. They also inform other vehicles and road users of the vehicle's driving state. For example, a headlamp and a fog lamp are designed for the lighting function, and a direction indicator, a taillight, a brake light, and a side marker are designed for the signaling function. Typically, halogen lamps and high intensity discharge (HID) lamps are used as a light source.

Recently, LEDs were adopted as a light source for vehicle headlamps or lighting devices. The color temperature of LEDs is approximately 5500 kelvin (K) which is close to sunlight. Thus, LEDs cause less eyestrain than other light sources. Since LEDs are small-sized, lamps using LEDs can be designed with a greater degree of freedom. In addition, LEDs are economical since they are semi-permanent. In this regard, LEDs are being introduced to reduce complexity in the configuration of lamps and prevent an increase in the number of processes required to manufacture the lamps. That is, attempts are being made to extend the life of lamps and reduce the space occupied by lamp apparatuses by taking advantage of properties of LEDs.

However, temperature remains a major challenge in the adoption of LEDs as a light source for vehicle lamps. As the performance of LEDs improves, the LEDs emit heat at higher temperatures, and the heat at higher temperatures reduces the performance of the LEDs. That is, as the temperature of LEDs increases, the luminous efficiency thereof significantly deteriorates. To address this problem, the junction temperature of LEDs must be increased, or a heat-dissipating apparatus for lowering the ambient temperature must be installed. In particular, since there is a limit to increasing the junction temperature, the heat-dissipating apparatus must be used efficiently. Although the junction temperature of LEDs is expected to increase continuously, an improved heat-dissipating apparatus is essential to increase the efficiency of a lamp more effectively.

FIG. 1 is a longitudinal cross-section of a conventional LED heat-dissipating apparatus 10. Referring to FIG. 1, a thermally conductive material 13 is disposed under the LED-mounting block 12 having an LED 11 mounted thereon. The LED-mounting block 12 and the thermally conductive material 13 are coupled together to a heat sink 14 by fixing bolts 15. The conventional LED heat-dissipating apparatus 10 has the following problems. When the LED-mounting block 12 is coupled to the heat sink 14 by the fixing bolts 15, the thermally conductive material 13 is compressed by the elasticity thereof, which may cause the LED 11 to be moved out of its intended position. In addition, after the thermally conductive material 13 is coupled to the heat sink 14, aiming control is required.

The above information disclosed in this Background section is only for enhancement of understanding of the background of the invention and therefore it may contain information that does not form the prior art that is already known in this country to a person of ordinary skill in the art.

SUMMARY

According to an aspect of the present invention, there is provided a heat-dissipating apparatus including: an LED-mounting block having an LED mounted thereon; a thermally conductive material disposed adjacent to the LED-mounting block for transmitting heat generated by the LED; and a heat sink disposed adjacent to the thermally conductive material for dissipating the heat transmitted by the thermally conductive material, wherein a concave portion is formed in one side of the LED-mounting block which is adjacent to the thermally conductive material or in one side of the heat sink which is adjacent to the thermally conductive material, and the thermally conductive material is inserted in the concave portion.

According to another aspect of the present invention, there is provided a heat-dissipating apparatus including: an LED-mounting block having an LED mounted thereon; a thermally conductive material disposed adjacent to the LED-mounting block for transmitting heat generated by the LED; and a heat sink disposed adjacent to the thermally conductive material for dissipating the heat transmitted by the thermally conductive material, wherein a spacer is interposed between a bottom surface of the LED-mounting block and a top surface of the heat sink.

According to still another aspect of the present invention, there is provided a heat-dissipating apparatus including: an LED-mounting block having an LED mounted thereon; a thermally conductive material disposed adjacent to the LED-mounting block for transmitting heat generated by the LED; and a heat sink disposed adjacent to the thermally conductive material for dissipating the heat transmitted by the thermally conductive material, wherein a first concave portion is formed in one side of the LED-mounting block which is adjacent to the thermally conductive material and a second concave portion is formed in one side of the heat sink which is adjacent to the thermally conductive material, and the thermally conductive material is inserted in the first and second concave portions.

According to a further aspect of the present invention, there is provided a vehicle lamp apparatus including the above-described heat-dissipating apparatus. An example of the vehicle lamp apparatus may include: a housing formed with an opening in a rear portion of the housing; a transparent cover attached to a front portion of the housing; at least one light source unit positioned in the housing, wherein the light source unit each comprises at least one LED; at least one reflector reflecting light emitted from the light source unit or units toward the front portion of the housing; a support fixing the light source unit or units to the housing and supporting the light source unit or units; an LED-mounting block having the LED mounted thereon; a thermally conductive material disposed adjacent to the LED-mounting block for transmitting heat generated by the LED; and a heat sink disposed adjacent to the thermally conductive material for dissipating the heat transmitted by the thermally conductive material, wherein at least one concave portion is formed in one side of the LED-mounting block which is adjacent to the thermally conductive material, one side of the heat sink which is adjacent to the thermally conductive material, or both.

However, aspects of the present invention are not restricted to the one set forth herein. The above and other aspects and features of the present invention will become more apparent to one of ordinary skill in the art to which the present invention pertains by referencing the detailed description of the present invention given below.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
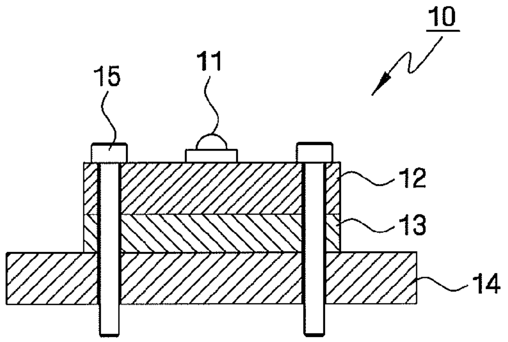
FIG. 1 (PRIOR ART)
FIG. 1 is a longitudinal cross-section of a conventional LED heat-dissipating apparatus.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In some embodiments, well-known processing processes, well-known structures and well-known technologies will not be specifically described in order to avoid ambiguous interpretation of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Embodiments of the invention are described herein with reference to cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In addition, each component shown in figures of the present invention may have been enlarged or reduced for ease of description. Like reference numerals in the drawings denote like elements, and thus their description will be omitted.

Hereinafter, an LED heat-dissipating apparatus according to exemplary embodiments of the present invention will be described in detail with reference to the attached drawings.

Figure 2:
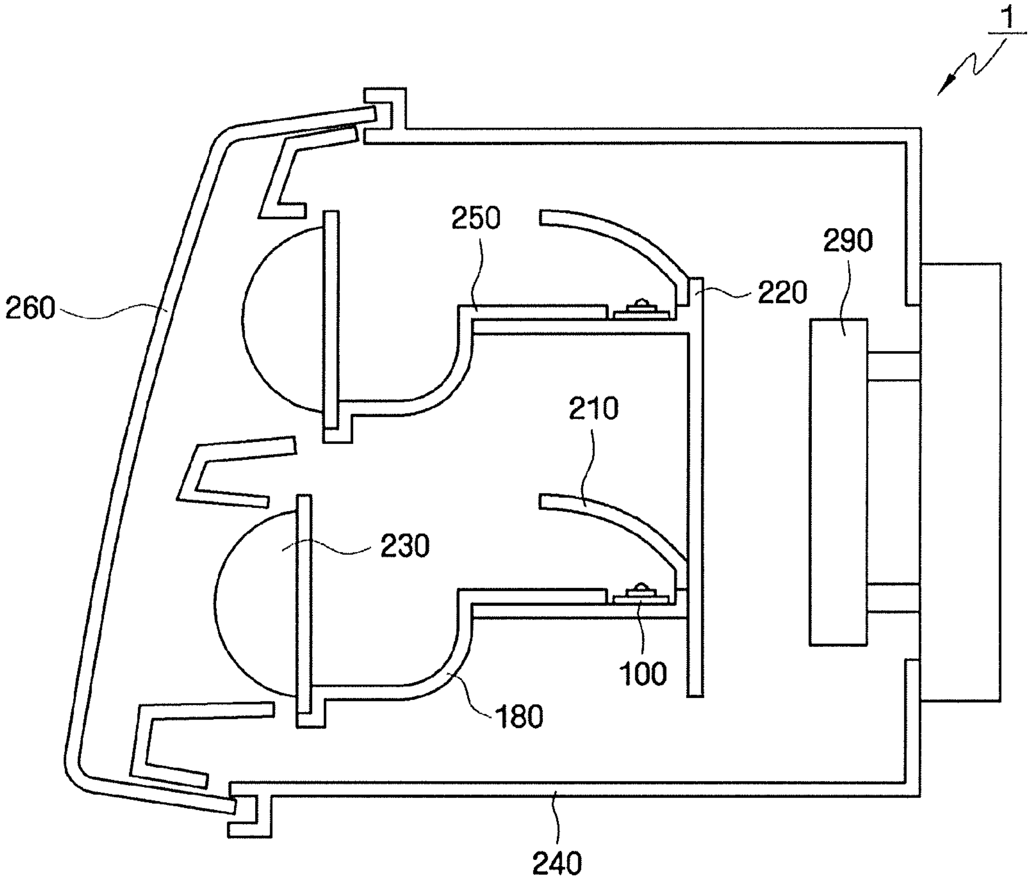
FIG. 2 schematically shows a longitudinal section of a vehicle lamp apparatus according to an exemplary embodiment of the present invention.

FIG. 2 schematically shows a longitudinal section of a vehicle lamp apparatus 1 according to an exemplary embodiment of the present invention. Referring to FIG. 2, the vehicle lamp apparatus 1 may include a housing 240, a transparent cover 260, one or more LED light source units 110, one or more reflectors 210, and a support 220. The vehicle lamp apparatus 1 may be applied to, for example, a vehicle headlamp, a vehicle rear lamp, or a vehicle fog lamp.

The transparent cover 260 is attached to the front of the housing 240, and light emitted from the LED light source units 110 passes through the transparent cover 260.

Each of the LED light source units 110 may include at least one LED and generate and emit light. The housing 240 may include the support 220. The support 220 fixes the LED light source units 110 to the housing 240 and thus supports the LED light source units 110.

The reflectors 210 may reflect light generated by the LEDs toward the front of the housing 240. The reflectors 210 may be classified as parabolic reflectors (concave reflectors), linear reflectors, or optic reflectors (convex reflectors) according to their shape. Each of the reflectors 210 may be configured so as to include a plurality of cells each having different curvatures, which can control light diffusion in a desired manner.

A vehicle lamp, which emits light generated by one or more LED light source units toward the front of a housing 240 by using one or more reflectors as described above, is referred to as a reflection-type lamp.

The vehicle lamp apparatus 1 according to the present embodiment may further include one or more projection lenses 230 which diffuse light reflected by the reflectors 210 toward the front of a vehicle. The number of the projection lens 230 may vary corresponding to that of the LED light source unit 110.

The projection lenses 230 are aspheric lenses. Since all light, which is generated by the LED light source units 110, passes through respective focuses of the projection lenses 230, it may be emitted in a straight line. Alternatively, light generated by the LED light source units 110 may be reflected by the reflectors 210 and then passed through the respective focuses of the projection lenses 230, respectively. Thus, the light may be emitted in a straight line. When all light is emitted through the projection lenses 230 toward the front of the vehicle, it may dazzle drivers of oncoming vehicles. Therefore, shields may be installed near the focuses of the projection lenses 230, respectively, to prevent light from being emitted through a portion of each of the projection lenses 230 above a horizontal line that passes through the center of each of the projection lenses 230.

A vehicle lamp, which uses one or more projection lenses as described above, is referred to as a projection-type lamp.

As described above, the vehicle lamp apparatus 1 may use a reflection-type lamp, a projection-type lamp, or a combination of the same according to the way in which light generated by the LED light source units 110 is emitted toward the front of the vehicle.

Figure 3:
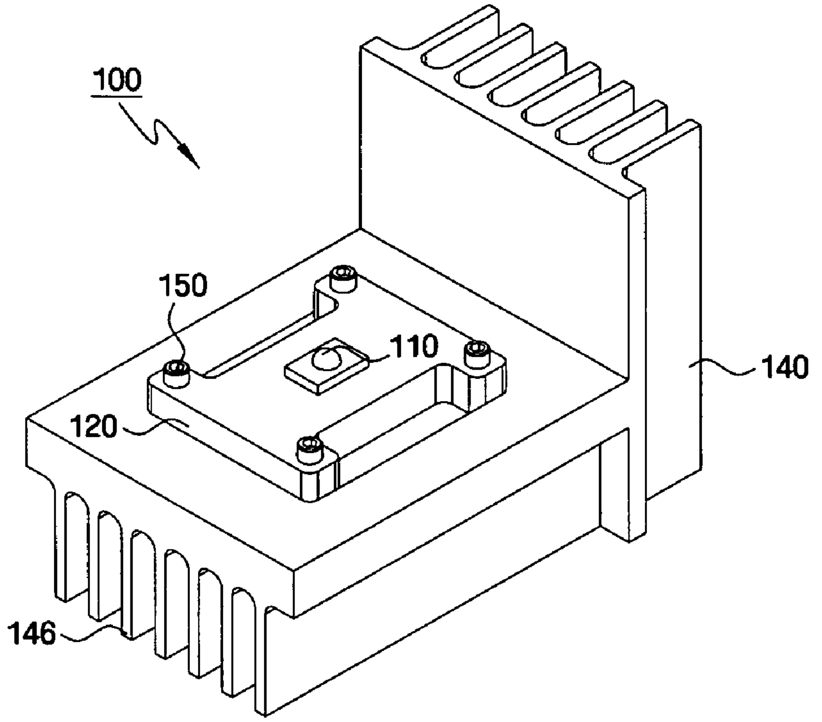
FIG. 3 is a perspective view of a heat-dissipating apparatus according to an exemplary embodiment of the present invention.
Figure 4:
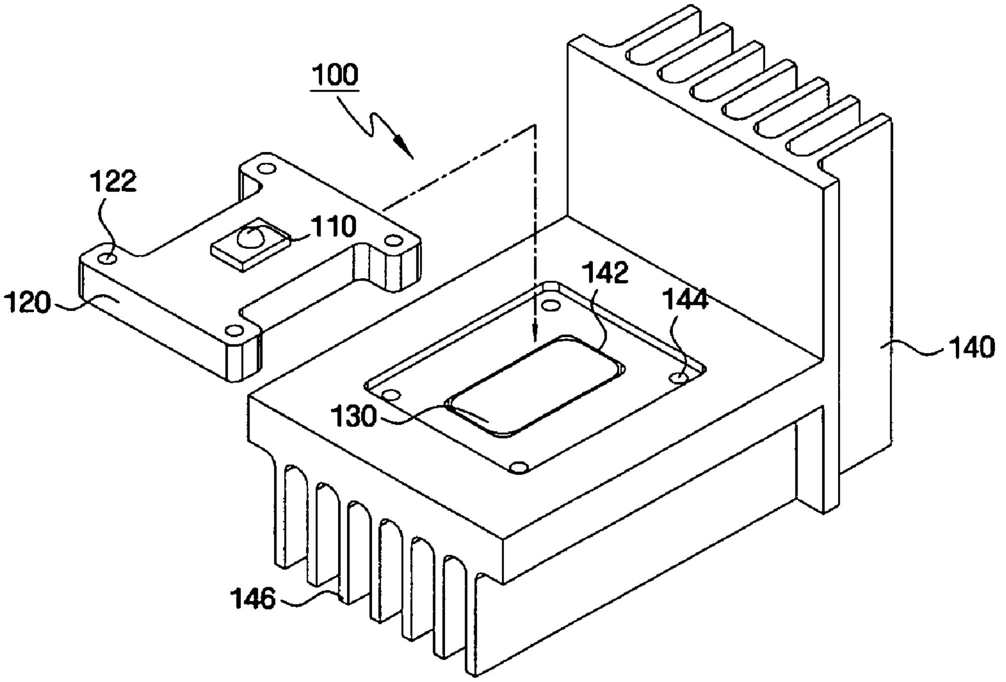
FIG. 4 is a perspective view showing an example in which a thermally conductive material is inserted into the LED light source unit in an a heat-dissipating apparatus according to an exemplary embodiment of the present invention.

FIG. 3 is a perspective view of a heat-dissipating apparatus according to an exemplary embodiment of the present invention, FIG. 4 is a perspective view showing an example in which a thermally conductive material is inserted into the LED light source unit in a heat-dissipating apparatus according to an exemplary embodiment of the present invention.

The LED heat-dissipating apparatus according to the present embodiment may include an LED 110, an LED-mounting block 120, and a heat sink 140.

The LED 110 is a lighting device which can reduce power consumption, extend the life of a lamp, and reduce the size of a lamp apparatus.

Figure 9:
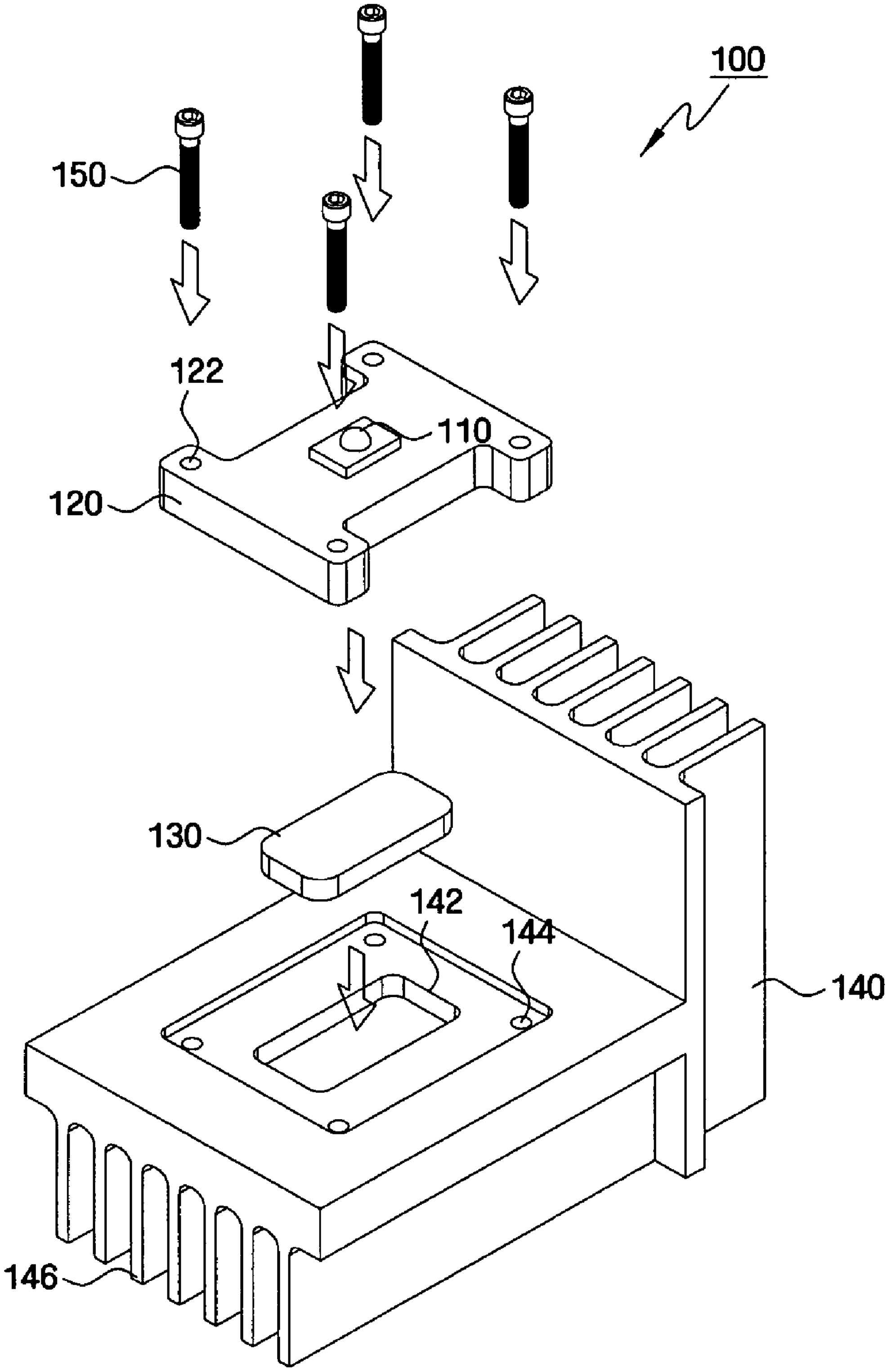
FIG. 9 is an exploded perspective view for explaining a method of assembling the heat-dissipating apparatus of FIG. 5 according to an exemplary embodiment of the present invention.

The LED 110 may be fixed to the LED-mounting block 120. In addition, as shown in FIG. 9, a plurality of coupling holes 122, such as drill holes, counterbores or countersinks, may be formed in the LED-mounting block 120 such that the LED-mounting block 120 can be coupled to the heat sink 140. Alternatively, the coupling holes 122 may be screw taps.

A thermally conductive material 130 may be disposed adjacent to the LED-mounting block 120, and heat emitted from the LED 110 may be transferred to the thermally conductive material 130. The thermally conductive material 130 may be interposed between the LED-mounting block 120 and the heat sink 140. In addition, the thermally conductive material 130 may insulate the LED-mounting block 120 from the heat sink 140. Suitably, the thermally conductive material 130 may be, but not limited to, silicon. The thermally conductive material 130 may absorb and dissipate heat, thereby preventing heat generated by the LED 110 from causing malfunctions and errors and improving shock-absorbing and dust-proof effects.

Preferably, for example, a thermal pad, thermal grease, a thermal tape, or the like may be used as the thermally conductive material 130. The thermal pad may be substantially rectangular and may be an elastic body that contains silicon-based polymer. The thermal pad may have a multi-layer structure composed of a thermally conductive layer, which is made of soft resin containing thermally conductive metallic powder, and an insulating layer which is made of soft resin containing inorganic powder or ceramic powder. The thermal grease may be made of a gel-type liquid material and applied between the LED-mounting block 120, which is a heating element, and the heat sink 140. The thermal tape may have a similar structure to the thermal pad and may be made of a thermally conductive adhesive.

The heat sink 140 may be disposed adjacent to the thermally conductive material 130 and dissipate heat received from the thermally conductive material 130 out of the heat sink 140. That is, the heat sink 140 may receive heat from the LED 110 via the thermally conductive material 130 and uniformly disperse the heat all over the heat sink 140 so that the heat can be easily released into the air through the cooling fan 290. Accordingly, the heat sink 140 is required to have a large surface area. When the LED heat-dissipating apparatus includes the cooling fan 290, the heat sink 140 may be structured to allow wind from the cooling fan 290 to easily flow out of the heat sink 140. To this end, the heat sink 140 may include a plurality of protrusions 146 which are shaped like wings.

Preferably, the heat sink 140 may be made of aluminum. Aluminum is malleable and has superior thermal conductivity. The material of the heat sink 140, however, is not limited to aluminum and may be changed by those of ordinary skill in the art to which the present invention pertains.

A plurality of coupling holes 144, such as screw taps, may be formed in the heat sink 140 such that the heat sink 140 can be coupled to the LED-mounting block 120. Alternatively, the coupling holes 144 may be drill holes, counterbores, or countersinks.

The LED heat-dissipating apparatus may further include a coupling member 150 used to couple the LED-mounting block 120 to the heat sink 140. The coupling member 150 may be, e.g., a bolt or a screw. However, the method of coupling the LED-mounting block 120 to the heat sink 140 is not limited to bolting or screwing the LED-mounting block 120 to the heat sink 140 and may be changed by those of ordinary skill in the art.

In the LED-heat dissipating apparatus according to the present embodiment, a concave portion 142, into which the thermally conductive material 130 is inserted, may be formed in a portion of the surface of the LED-mounting block 120, which is adjacent to the thermally conductive material 130, or a portion of the surface of the heat sink 140 which is adjacent to the thermally conductive material 130.

An LED heat-dissipating apparatus having a thermally conductive material inserted thereinto according to various embodiments of the present invention will now be described with reference to FIGS. 5 through 8.

Figure 5:
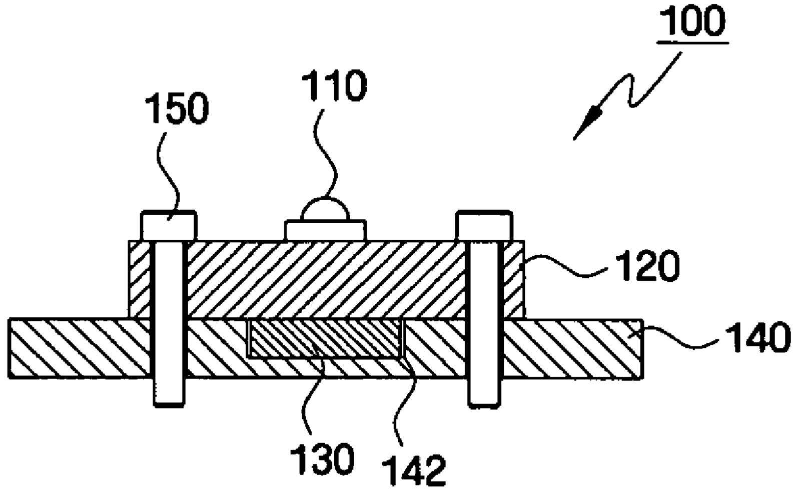
FIG. 5 is a longitudinal cross-section of a heat-dissipating apparatus according to an exemplary embodiment of the present invention.

In an embodiment, referring to FIG. 5, a concave portion 142 may be formed in a portion of the heat sink 140, which is adjacent to the thermally conductive material 130, and the thermally conductive material 130 may be inserted into the concave portion 142.

The shape of the concave portion 142 may correspond to that of the thermally conductive material 130, so that the thermally conductive material 130 can be completely inserted into the concave portion 142. In addition, the depth of the concave portion 142 may be equal to or greater than the height of the thermally conductive material 130. The depth of the concave portion 142 may be equal to the height of the thermally conductive material 130 such that a top surface of the heat sink 140 is level with that of the thermally conductive material 130. Thus, a bottom surface of the LED-mounting block 120 may be adjacent to the top surface of the heat sink 140.

As shown in FIG. 5, the thermally conductive material 130 is inserted and thus fixed to the concave portion 142 which is formed in the heat sink 140. Therefore, when the LED-mounting block 120 is coupled onto the heat sink 140, the LED-mounting block 120 can be prevented from moving out of its intended position due to the elasticity of the thermally conductive material 130. Accordingly, the LED 110 can remain at its intended position.

Figure 6:
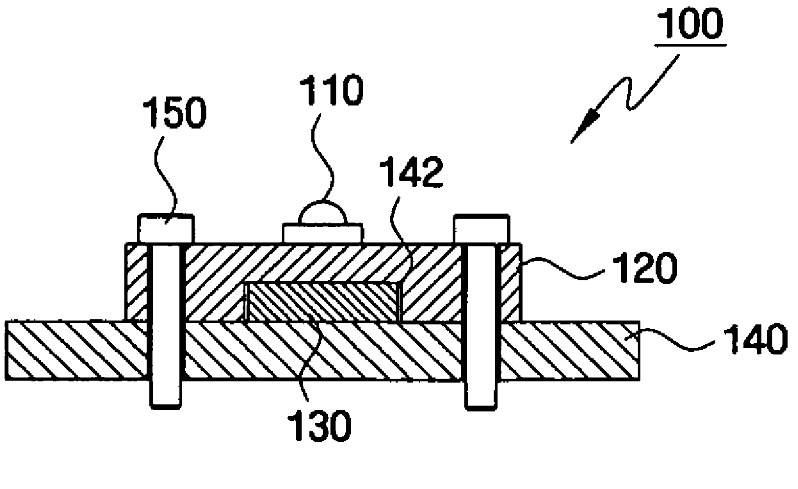
FIG. 6 is a longitudinal cross-section of a heat-dissipating apparatus according to an exemplary embodiment of the present invention.

In another embodiment, referring to FIG. 6, a concave portion 142 may be formed in a portion of the LED-mounting block 120, which is adjacent to the thermally conductive material 130, and the thermally conductive material 130 may be inserted into the concave portion 142.

As described above, the shape of the concave portion 142 may correspond to that of the thermally conductive material 130, and a bottom surface of the LED-mounting block 120 may level with that of the thermally conductive material 130.

Figure 7:
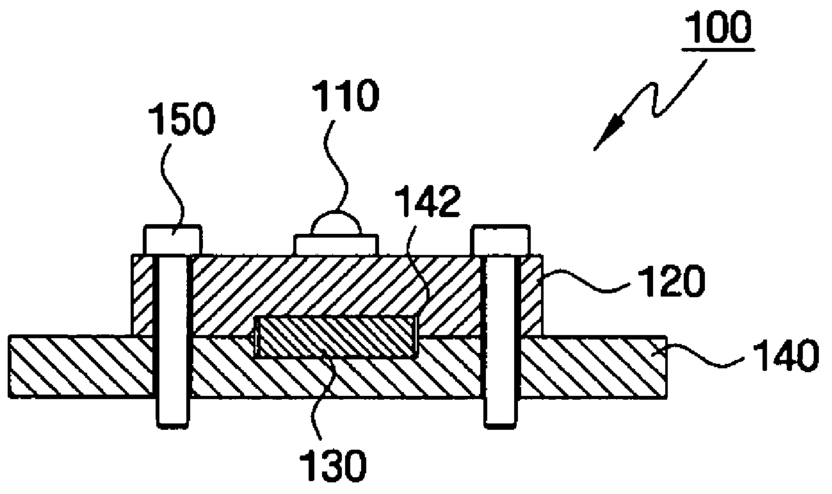
FIG. 7 is a longitudinal cross-section of a heat-dissipating apparatus according to an exemplary embodiment of the present invention.

In still another embodiment, referring to FIG. 7, a concave portion or concave portions 142 may be formed in a portion of the LED-mounting block 120, which is adjacent to a thermally conductive material 130 as well as in a portion of a heat sink 140, which is adjacent to the thermally conductive material 130, and the thermally conductive material 130 may be inserted into the concave portion 142.

The combined shape of the concave portions 142 formed in the LED-mounting block 120 and the heat sink 140, respectively, may correspond to that of the thermally conductive material 130. The sum of the height of the concave portion 142 formed in the LED-mounting block 120 and the height of the concave portion 142 formed in the heat sink 140 may be equal to the height of the thermally conductive material 130.

Figure 8:
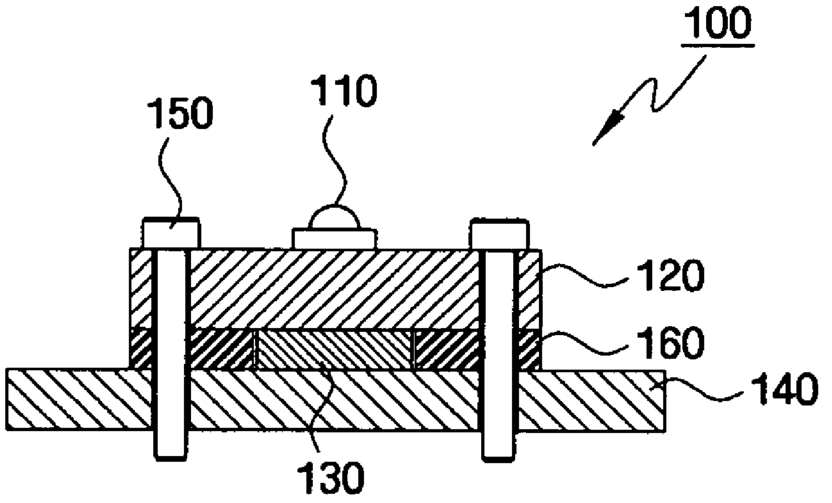
FIG. 8 is a longitudinal cross-section of a heat-dissipating apparatus according to an exemplary embodiment of the present invention including a spacer.
Figure 8A:
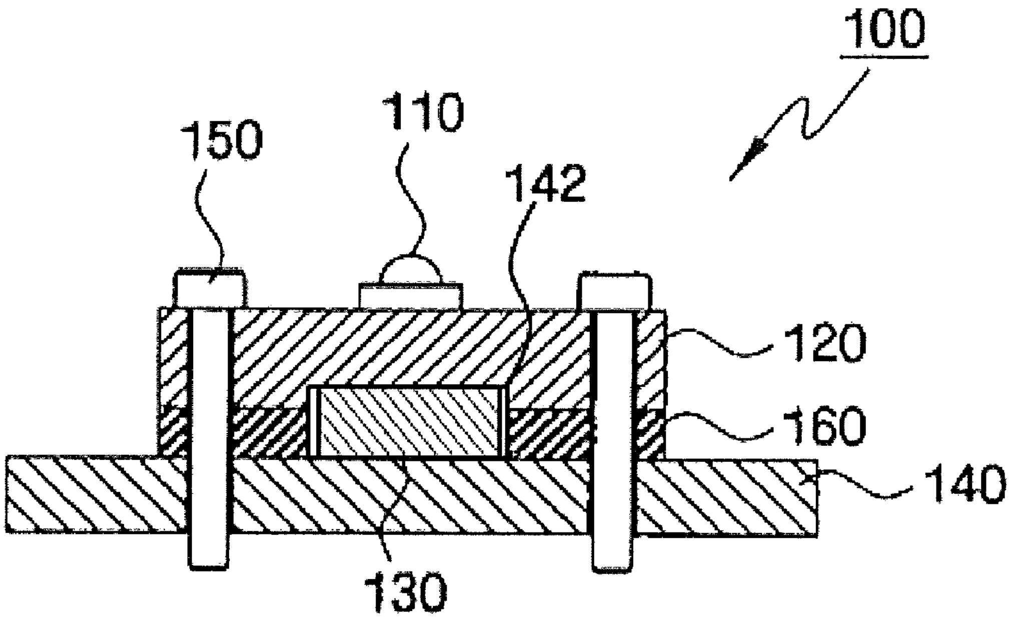
FIG. 8A is a longitudinal cross-section of a heat-dissipating apparatus according to an exemplary embodiment including concave portions and a spacer.

In a further embodiment, referring to FIG. 8, a spacer 160 may be interposed between a bottom surface of the LED-mounting block 120 and a top surface of the heat sink 140.

That is, a concave portion is not be formed in the LED-mounting block 120, which is adjacent to the thermally conductive material 130 and the heat sink 140, which is adjacent to the thermally conductive material 130. Instead, the spacer 160 having a through-hole in which the thermally conductive material 130 is formed. Preferably, the height of the through-hole is equal to that of the thermally conductive material 130.

As a result, when the LED-mounting block 120 is coupled onto the heat sink 140, the thermally conductive material 130 may not be compressed due to the spacer 160, which enables the LED 110 to remain at its intended position.

In a still further embodiment, even when the spacer 160 is interposed between the bottom surface of the LED-mounting block 120 and the top surface of the heat sink 140, a concave portion may be, when necessary, formed in a portion of the LED-mounting block 120, which is adjacent to the thermally conductive material 130, a portion of the heat sink 140, which is adjacent to the thermally conductive material 130, or both.

A method of assembling the LED heat-dissipating apparatus 100 as described above will now be described with reference to FIG. 9.

Referring to FIG. 9, the thermally conductive material 130 may be inserted into the concave portion 142 which is formed in a portion of the heat sink 140. Then, the LED-mounting block 120 having the LED 110 mounted thereon may be placed on a top surface of the thermally conductive material 130 and then coupled to the heat sink 140 by using the coupling members 150 such as bolts.

While the method of assembling the LED heat-dissipating apparatus 100 is described with the embodiment shown in FIG., it is obvious to those of ordinary skill in the art that the LED heat-dissipating apparatuses 100 according to the embodiments shown in FIGS. 6 through 8 can be assembled using methods similar to the above method.

As described above, in the LED heat-dissipating apparatuses according to exemplary embodiments of present invention, a concave portion(s) is formed in an LED-mounting block, a heat sink, or both, and a thermally conductive material is inserted into the concave portion(s). Alternatively, a spacer is interposed between the LED-mounting block and the heat sink, and the thermally conductive material is inserted into a through-hole in the spacer. As a result, an LED can be prevented from moving out of its intended position and can be positioned more precisely. Since no aiming control is required after the thermally conductive material is inserted into the LED-mounting block, the heat sink, or both, the manufacturing process of the LED-heat dissipating apparatus can be simplified.

It should be noted that the effects of the present invention are not restricted to the above. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and the meaning of the scope of the claims, the scope of the claims, and any changes will be construed as being within the scope of the present invention.

What is claimed is:

1. A heat-dissipating apparatus for a vehicle lamp comprising:

an LED-mounting block having an LED mounted thereon;

a concave portion formed in the LED-mounting block;

a thermally conductive material received in the concave portion and disposed adjacent to the LED-mounting block for transmitting heat generated by the LED;

a heat sink disposed adjacent to the thermally conductive material for dissipating the heat transmitted by the thermally conductive material; and a spacer interposed between a bottom surface of the LED-mounting block and a top surface of the heat sink, the spacer being rectangular in shape, with a side that contacts the LED-mounting block and an opposite side that contacts the heat sink, wherein the spacer has a through hole, and the thermally conductive material is received in the through hole, the thermally conductive material being at least one of a thermal pad, thermal grease, and a thermal tape.

2. The apparatus of claim 1, wherein the bottom surface of the LED-mounting block is adjacent to the top surface of the heat sink.

3. A heat-dissipating apparatus for a vehicle lamp comprising:

an LED-mounting block having an LED mounted thereon;

a thermally conductive material disposed adjacent to the LED-mounting block for transmitting heat generated by the LED;

a heat sink disposed adjacent to the thermally conductive material for dissipating the heat transmitted by the thermally conductive material; and a spacer interposed between a bottom surface of the LED-mounting block and a top surface of the heat sink, the spacer being rectangular in shape, with a side that contacts the LED-mounting block and an opposite side that contacts the heat sink, wherein the spacer has a through hole, and the thermally conductive material is received in the through hole, the thermally conductive material being at least one of a thermal pad, thermal grease, and a thermal tape.

4. The apparatus of claim 3, wherein a concave portion is formed in one side of the LED-mounting block which is adjacent to the thermally conductive material or in one side of the heat sink which is adjacent to the thermally conductive material, and the thermally conductive material is inserted in the concave portion.

5. The apparatus of claim 3, wherein a first concave portion is formed in one side of the LED-mounting block which is adjacent to the thermally conductive material, a second concave portion is formed in one side of the heat sink which is adjacent to the thermally conductive material, and the thermally conductive material is inserted in the first and second concave portions.

6. A heat-dissipating apparatus for a vehicle lamp comprising:

an LED-mounting block having an LED mounted thereon;

a thermally conductive material disposed adjacent to the LED-mounting block for transmitting heat generated by the LED;

a heat sink disposed adjacent to the thermally conductive material for dissipating the heat transmitted by the thermally conductive material; and a spacer interposed between a bottom surface of the LED-mounting block and a top surface of the heat sink, the spacer being rectangular in shape, with a side that contacts the LED-mounting block and an opposite side that contacts the heat sink, wherein the spacer has a through hole, and the thermally conductive material is received in the through hole, the thermally conductive material being at least one of a thermal pad, thermal grease, and a thermal tape, wherein a first concave portion is formed in one side of the LED-mounting block which is adjacent to the thermally conductive material and a second concave portion is formed in one side of the heat sink which is adjacent to the thermally conductive material, and the thermally conductive material is inserted in the first and second concave portions.

7. The apparatus of claim 6, wherein the thermally conductive material to be inserted in the first concave portion is the same as that to be inserted to be the second concave portion.

8. The apparatus of claim 6, wherein the thermally conductive material to be inserted in the first concave portion is different from that to be inserted to be the second concave portion.

9. A vehicle lamp apparatus comprising the heat-dissipating apparatus of claim 1.

10. A vehicle lamp apparatus comprising the heat-dissipating apparatus of claim 3.

11. A vehicle lamp apparatus comprising the heat-dissipating apparatus of claim 6.

12. The apparatus of claim 1, wherein the spacer has a same width as the LED-mounting block.

13. The apparatus of claim 3, wherein the spacer has a same width as the LED-mounting block.

14. The apparatus of claim 6, wherein the spacer has a same width as the LED-mounting block.

* * * * *